R. C. BRIGHT.
ANTISKID RUDDER FOR AUTOS.
APPLICATION FILED NOV. 18, 1915.

1,215,902.

Patented Feb. 13, 1917.

R. C. Bright,
Inventor

Witnesses by
Attorneys

UNITED STATES PATENT OFFICE.

ROSWELL C. BRIGHT, OF CLARENCE, MISSOURI, ASSIGNOR OF ONE-HALF TO ALBERT A. BEALS, OF CLARENCE, MISSOURI.

ANTISKID-RUDDER FOR AUTOS.

1,215,902.  Specification of Letters Patent.  Patented Feb. 13, 1917.

Application filed November 18, 1915. Serial No. 62,179.

*To all whom it may concern:*

Be it known that I, ROSWELL C. BRIGHT, a citizen of the United States, residing at Clarence, in the county of Shelby and State of Missouri, have invented a new and useful Antiskid-Rudder for Autos, of which the following is a specification.

The device forming the subject matter of this application is adapted to be assembled with a motor propelled vehicle for the purpose of preventing the vehicle from skidding sidewise, or from sliding rearwardly.

The invention contemplates the use of a vertically movable rudder, and one object of the invention is to improve this rudder so that the same will cut into the soil as the vehicle is advanced, the rudder being so constructed at its rear end that it will secure and retain a hold upon the ground, should the vehicle move rearwardly.

Another object of the invention is to provide novel means for assembling the rudder for vertical movement on the rear axle casing.

Another object of the invention is to provide novel means for holding the rudder yieldably uplifted.

A further object of the invention is to provide novel means for actuating the rudder vertically.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 4:
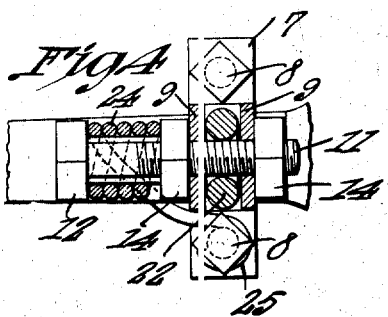
Fig. 4 is a sectional detail wherein parts appear in elevation, the view delineating the actuating spring for the rudder, and the means whereby the spring is sustained.

In the drawings there is shown a portion of a vehicle 1 which may embody a foot board 2, a rear axle casing 3, rear wheels 4 and a differential casing 5. Mounted upon the rear axle casing 3 upon each side of the differential casing 5 are two-part clamps, each clamp including a front member 6 and a rear member 7, the constituent members of the two clamps being united, above and below the axle casing 3 by means of bolts 8 or otherwise. The rear members 7 of the casing clamps are provided with vertically disposed, horizontally spaced ears 9 the ears of the respective clamps carrying pivot bolts 10 and 11. The bolt 11 is somewhat longer than the bolt 1 and embodies a head 12. Nuts 14 are threaded onto the bolt 11 and bear against the outer faces of the ears 9 of one clamp member, as will be understood readily from Fig. 4.

Figure 1:
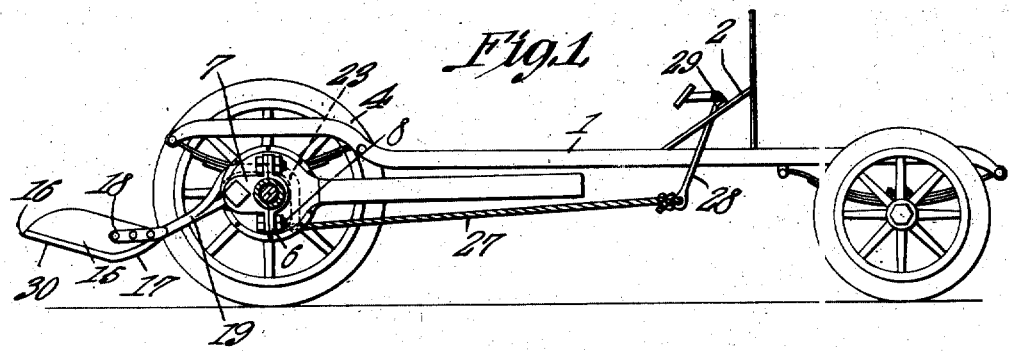
Figure 1 shows in side elevation, a portion of a motor propelled vehicle wherewith the device forming the subject matter of this application has been assembled, parts appearing in section.
Figure 2:
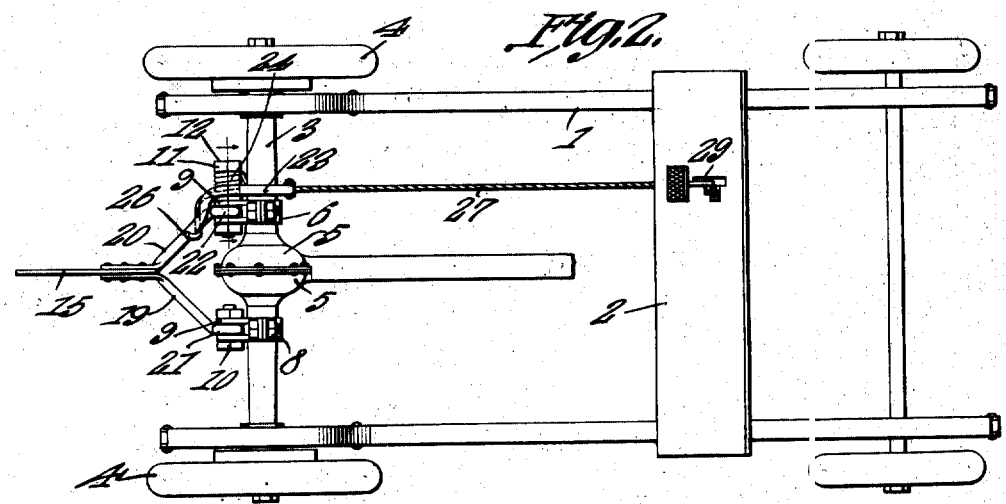
Fig. 2 is a top plan showing a portion of a motor propelled vehicle to which the structure herein disclosed has been applied.
Figure 3:
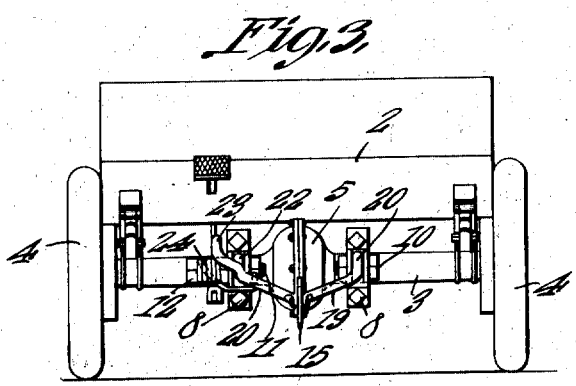
Fig. 3 is a rear elevation of a vehicle carrying the device forming the subject matter of this application.

The invention contemplates the use of a rudder 15, preferably in the form of a rigid plate of metal and embodying a rigid lower edge 30. The rear, upper edge of the rudder 15 is downwardly inclined, to form an earth entering point 16, the function of which will be made manifest hereinafter. The forward, lower edge of the rudder 15 is upwardly inclined to form an earth entering prow 17. The edges 30 and 17 are sharpened. Secured at their rear ends to opposed faces of the rudder 15, as shown at 18, are upwardly extended, diverging arms 19 and 20. The arm 19 terminates in an eye 21, mounted to swing on the pivot bolt 10, between the ears 9 of the clamp wherewith the pivot bolt 10 is assembled. The arm 20 is provided with an eye 22, mounted to swing on the pivot bolt 11, between the ears 9 of the clamp through which the pivot bolt passes. The arm 20 is supplied with a curved, depending extension 23, passing over the top of the axle casing 3. Surrounding the pivot bolt 11 and located between the head 12 and one nut 14 is a helical spring 24, one end of which, denoted by the numeral 25 is formed into an eye engaged by one of the clamp bolts 8. The other end 26 of the spring 24 is formed into a hook or other attaching element interengaged with the arm 20 as shown best in Fig. 2. It will now be understood that the function of the spring 24 is to elevate the rudder 15, so that the same normally stands out of contact with the ground, as indicated in Fig. 1.

The invention comprises a connection in the form of a wire rope 27, the rear end of which is attached to the lower end of the extension 23 which constitutes a part of an arm 20. The forward end of the rope 27 is attached to the lower end of a pedal 28 of any desired form, fulcrumed as shown at 29 upon the foot board 2 or upon some other accessible portion of the vehicle 1.

In practical operation, when the pedal 28 is moved, the connection 27 will be actuated, the same tilting the arms 20 and 19 through the instrumentality of the extension 23. Thus the rudder 15 is lowered into contact with the ground, the spring 24 being put under tension. When the pressure on the pedal 28 is relieved, the spring 24 will react on the arm 20 and lift the rudder 15 out of contact with the ground, and into the position shown in Fig. 1. Because the forward edge of the rudder 15 is inclined as shown at 17, the rudder will cut readily into the ground when lowered. It is to be observed that the rudder 15 is in the form of a rigid plate, the lower edge 30 of which is rigid, continuous, sharp, and well adapted to enter the ground and to retain a secure hold thereon, the construction above outlined being far more efficacious than one in which rollers or other anti-friction elements are journaled on the rudder adjacent its lower edge.

Owing to the fact that the rudder at its rear end terminates in an earth entering point 16, the rudder will bite into the ground, should the vehicle start to move rearwardly.

The primary function of the rudder, however, as will be understood from the drawings, is to prevent the vehicle from skidding laterally.

It is to be observed that one end of the spring 24 is assembled with one of the clamps, the other end of the spring being connected with the arm 20 of the rudder 15. As a consequence, no part of the spring is connected to the vehicle body proper. It is therefore unnecessary to work any changes in the vehicle body, in order to provide a connection for the spring 24, the spring constituting a part of the rudder mechanism which, generally considered, may be connected with the rear axle casing 3 without changing the standard construction thereof.

Having thus described the invention, what is claimed is:—

In a device of the class described, a vehicle embodying a rear axle casing; clamps assembled with the axle casing; pivot elements in the clamps; a rudder; diverging arms attached to the rudder and mounted on the pivot elements, one arm embodying an extension prolonged above the axle casing and extended vertically with respect thereto; a spring surrounding one pivot element, one end of the spring being united with the clamp which carries the said pivot element, and the other end of the spring being engaged with one arm to elevate the rudder; and vehicle carried means under the control of an operator and connected with the extension for depressing the rudder.

In testimony that I claim the foregoing as my own, I have hereto affixed my signature in the presence of two witnesses.

ROSWELL C. BRIGHT.

Witnesses:
 BEN. G. PHLEGAR,
 ERNEST ST. AUBYN.